United States Patent [19]

Kennedy

[11] 4,197,066

[45] Apr. 8, 1980

[54] APPARATUS FOR MAKING DIAMONDS

[75] Inventor: George C. Kennedy, Los Angeles, Calif.

[73] Assignee: High Pressure Technology, Inc., Marina del Rey, Calif.

[21] Appl. No.: 8,485

[22] Filed: Feb. 2, 1979

[51] Int. Cl.² ............................................. B30B 11/32
[52] U.S. Cl. ...................................... 425/77; 425/352
[58] Field of Search .......................... 425/77, DIG. 26

[56] References Cited

U.S. PATENT DOCUMENTS

| | | | |
|---|---|---|---|
| 3,548,190 | 12/1970 | Sclar et al. | 425/77 X |
| 3,635,616 | 1/1972 | Venkatesan | 425/77 |
| 3,642,412 | 2/1972 | Pope et al. | 425/77 |
| 3,704,969 | 12/1972 | Kennedy | 425/77 |
| 4,118,161 | 10/1978 | Kennedy | 425/77 |
| 4,119,708 | 10/1978 | Kennedy | 425/DIG. 26 |

*Primary Examiner*—J. Howard Flint, Jr.
*Attorney, Agent, or Firm*—Poms, Smith, Lande & Rose

[57] ABSTRACT

A piston type system for forming industrial diamonds is provided with a pressure vessel which includes a tungsten carbide member having a central opening which has a tapered mouth at one end, and which is lined with a salt bushing. A charge including invar and graphite to be converted to diamond is inserted within the pressure chamber inside the salt bushing. An end load plate has a central opening of substantially the same diameter as the opening in the salt bushing and has a tapered flange which fits into the tapered mouth in the tungsten carbide pressure vessel. A tungsten carbide piston which has a diameter about 0.003 inch less than the diameter of the opening in the end plate, and which has a lead gasket between its surface and that of the opening in the end plate, is forced through the end plate and applies high pressure at high temperatures to the charge, thereby converting the graphite to diamond after the passage of a suitable period of time. The tungsten carbide piston need only have the diameter of the inner diameter of the salt bushing, instead of a diameter equal to the full I.D. of the tungsten carbide pressure vessel.

9 Claims, 5 Drawing Figures

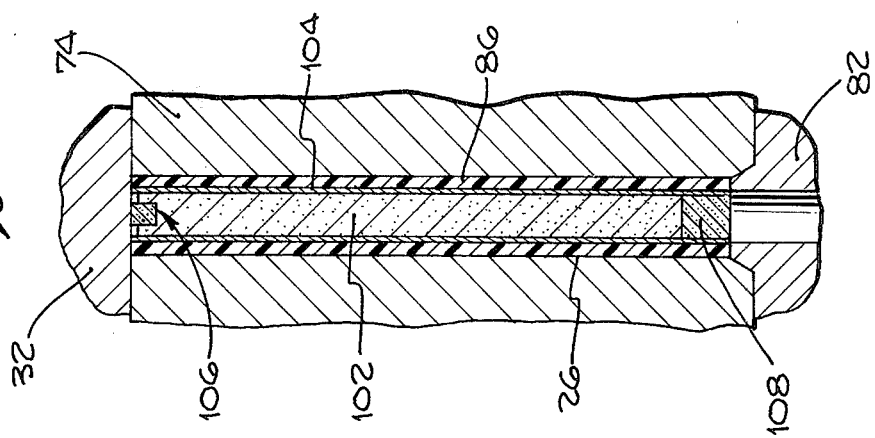
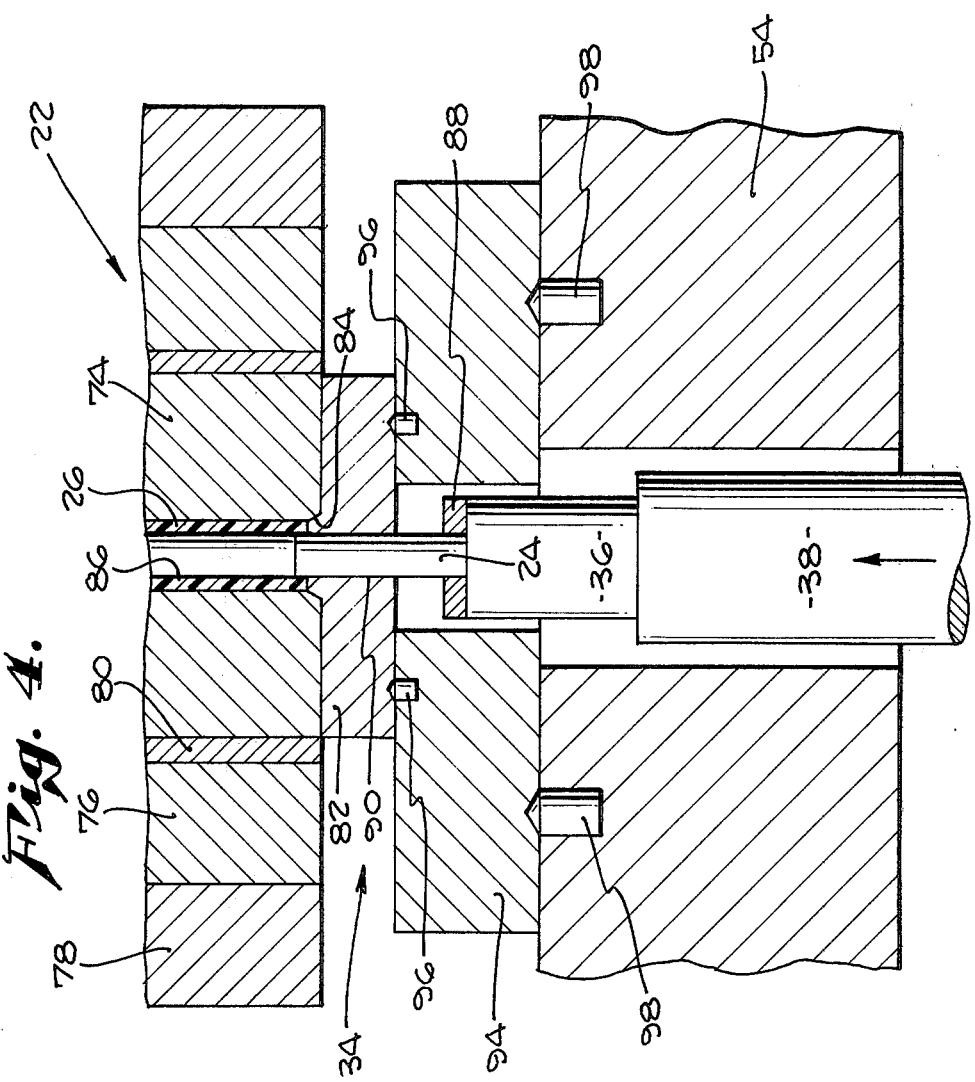

APPARATUS FOR MAKING DIAMONDS

BACKGROUND OF THE INVENTION

This invention relates to apparatus for manufacturing industrial diamonds.

Two known methods of making diamonds are disclosed in my U.S. Pat. No. 3,704,969. One of the early methods of making diamonds is shown in FIG. 2 of that patent, and involves the so-called "belt" method of making diamonds in which a charge was compressed between two dies. Unfortunately, however, because of the limited travel of the dies, and the further fact that the density of diamond is about 3.4, while that of graphite is only about 2.23, the limited travel of the two dies necessarily limited the amount of graphite which could be converted to diamond.

U.S. Pat. No. 4,119,708 disclosed an arrangement for use with a tungsten carbide piston which could have a longer travel, and greater compression of the charge. A hollow cylindrical bushing of salt is provided within a cylindrical opening in a tungsten carbide member, and a tungsten carbide piston is provided which has an outer diameter equal to the inner diameter of the opening in the tungsten carbide member forming the pressure vessel. The salt serves to insulate the central charge which is heated up by the flow of electricity through it. In the arrangement of U.S. Pat. No. 4,119,708, a plug of zinc is provided at the end of the charge so that, as the tungsten carbide piston is advanced, the zinc squeezes down into the inner diameter of the salt bushing and transmits the force of the piston to the charge within the bushing. By this technique, deformation of the salt bushing is avoided.

Unfortunately, the deformable member made of zinc does not always flow regularly or smoothly. In addition, the diameter of the tungsten carbide piston must be the full diameter of the opening in the tungsten carbide block, and such large diameter pistons are expensive, particularly with the frequent failure of tungsten carbide pistons at the high temperatures and pressures which are involved.

Accordingly, principal objects of the present invention are to reduce the diameter of the tungsten carbide piston which is employed for a given size charge, in the manufacturer of industrial diamonds, to improve control in the application of mechanical power to the charge, and to increase the dimensional stability of the process.

SUMMARY OF THE INVENTION

In accordance with the present invention, instead of having the diameter of the tungsten carbide piston equal to the full diameter of the opening in the pressure chamber, the piston only has a diameter approximately equal to the inner diameter of the salt bushing. With this change, the deformable zinc end member may be dispensed with. The tungsten carbide piston is applied to the pressure chamber from a cylindrical opening in a steel end plate which abuts the pressure vessel. The mouth of the tungsten carbide pressure vessel may be recessed or tapered, and the steel end load plate is provided with a correspnding protruding rim to align the bore of the end load plate to the core of the pressure vessel. The I.D. of the steel end load plate is substantially equal to the I.D. of the salt bushing, to support and mechanically contain the tungsten carbide piston as it is advanced to apply pressure to the charge.

An additional end load plate may be provided to engage the piston guiding end load plate, and a supplemental end load platen may abut and be aligned with the two end plates to complete the lower support for these members. The second end load plate and the end load platen are provided with central openings having clearance to permit the passage of piston pushing elements which supply force to the tungsten carbide piston. The tungsten carbide piston may be provided with a conventional binding ring at its lower end to reduce the likelihood of breakage or fracture which occurs when tungsten carbide members are subject to undue pressure over extended lengths. The tungsten carbide pressure vessel is enclosed by massive steel binding rings to provide additional mechanical support and strength.

The charge may be powdered invar and graphite, in a relatively long stainless steel cylinder. In order to maintain a relatively flat temperature characteristic from one end of the charge to the other, special carbon elements are provided at each end to compensate for heat losses at the ends. At the fixed end the element may be carbon, while at the moving end of the charge, the heating element may be a combination of boron nitride and graphite which are compressed to seal the end. This combination has the desired high resistance from an electrical standpoint, and also has mechanical properties which will permit easy movement and compression of this end of the charge.

In order to simplify the location of the supplemental end load plate and the end load platen, hardened and ground tapered locating pins may be provided for securing in one of the mating elements, with corresponding recesses in the adjacent plates.

Advantages of the present improved apparatus include reduction in cost in view of the reduced diameter of the piston; better control of the application of power to the piston; and increased dimensional stability of the compressed sample. In addition, there is more space within the pressure vessel for the charge when the zinc plug is not employed.

Other objects, features and advantages of the present invention will become apparent from a consideration of the following detailed description, and from the accompanying drawings.

BRIEF DESCRIPTION OF THE DRAWINGS

FIG. 4 is a detailed showing of a portion of the press assembly of FIG. 2 in partial cross section; and FIG. 5 is a schematic showing of the pressure chamber per se together with the configuration of the charge and its container prior to heating and compression.

DETAILED DESCRIPTION

Figure 1:
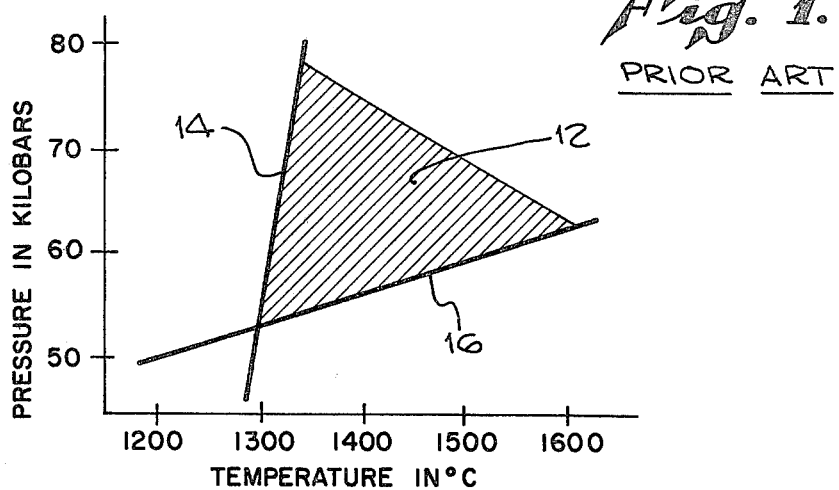
FIG. 1 is a plot of pressure versus temperature for the critical temperatures and pressures required for growing diamonds in a particular solution.

Many of the background facts relating to the manufacture of diamonds are well known at present, and a number of these facts are set forth in U.S. Pat. No. 3,704,969. FIG. 1 of the present drawings, which is similar to FIG. 1 of the above-identified patent, shows a region 12 bounded to the left and right by the lines 14 and 16 which represents a region in the pressure versus temperature field in which industrial diamonds may be formed. In FIG. 1, the line 16 represents a critical transition line for the element carbon with diamonds being the stable state for carbon above the line 16, and graphite being the stable state for carbon below line 16. Incidentally, and as mentioned above, the density of diamond is about 3.4, while the density of graphite is only about 2.23. According, in addition to raising the temperature and pressure to the shaded zone as indicated in FIG. 1, the charge from which the diamonds are being made is reduced substantially in volume as the transition from graphite to diamonds occurs.

In addition, in order to convert graphite to diamond, graphite must first be mixed with a suitable quantity of material which, when the material is in its liquid phase, is a good solvent for carbon. One such material is a nickel-iron alloy having 50% nickel and 50% iron. The line 14, which extends almost at right angles from line 16, is a phase boundary line, with the left hand side of the phase boundary line 14 representing the solid phase of the alloy, and the right hand side of line 14 representing the liquid phase. In practice, a charge including powdered graphite and powdered particles of the nickel iron alloy are heated and compressed to a point well within the shaded zone 12 as shown in FIG. 1. In this region the alloy is in its liquid phase, and the graphite goes into solution. If the temperature is held just above the line 16, as discussed in the above cited U.S. Pat. No. 3,704,969, diamonds begin to form and crystallize out, particularly if the charge is held at this point for a period of time. Then, by gradually cooling the melt, the state of the charge shifts to the left as shown in FIG. 1 and the charge solidifies. The diamonds are later extracted from the solidified mass by well known acid dissolving techniques.

Figure 2:
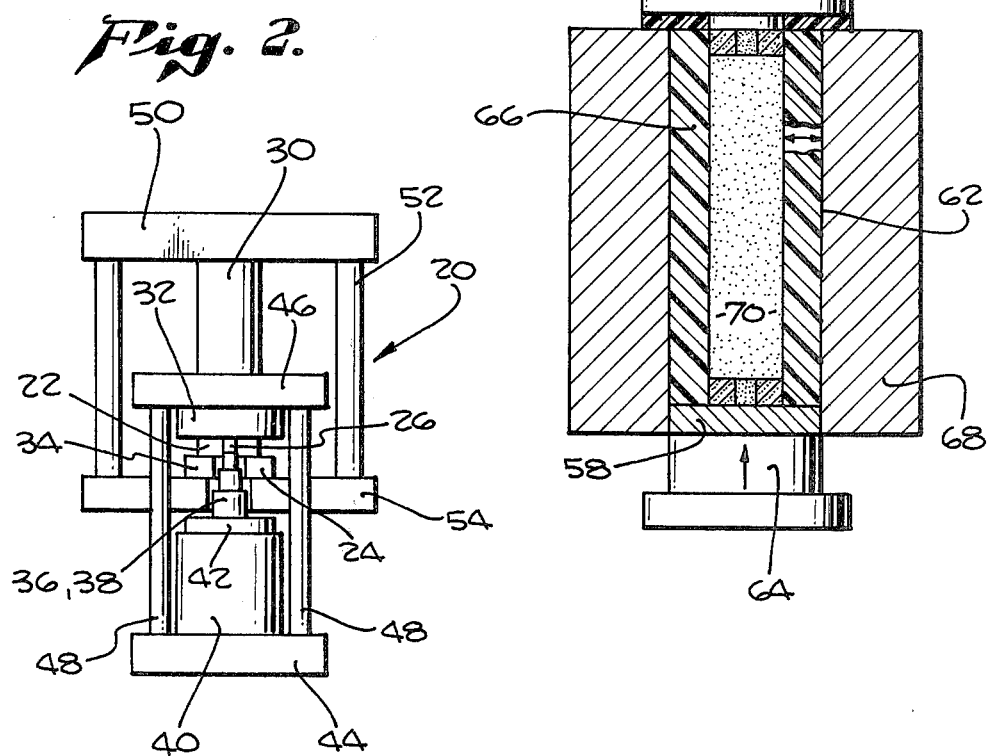
FIG. 2 is a schematic showing of a press employed for making industrial diamonds.

FIG. 2 is a schematic representation of a high pressure apparatus 20 which may be used to convert graphite to diamond. High pressure apparatus of the general type shown in FIG. 2 is discussed by Kennedy and LaMori in an article entitled "Some Fixed Points On The High Pressure Scale" which appeared in "Progress in Very High Pressure Research", Bundy, Hibbard and Strong, ed., J. Wiley and Sons 1961, and in an article by Kennedy, Haygarth and Getting entitled "Determination of the Pressure of Barium I-II Transition With Single Stage Piston—Cylinder Apparatus" appearing in the Journal of Applied Physics, Volume 38, No. 12, pages 4557–4564, November 1967.

Returning now to FIG. 2 (which is not drawn to scale), toward the center of the figure is a composite pressure vessel 22 and piston 24. The composite pressure vessel 22 has a central pressure chamber 26 into which a charge is placed and into which the piston 24 is forced to properly compress the charge under suitable high temperature and pressure conditions. The piston 24, and the central portion of the composite member 22 are made of cemented tungsten carbide in view of the outstanding capability of this material to withstand very high pressure. However, its capability to withstand very high pressures is marginal in the vicinity of 50 kilobars and higher which is required for the fabrication of diamonds. Accordingly, the relatively complex high pressure apparatus of FIG. 2 is provided, with its two hydraulic cylinders 40 and 30 to supply high levels of supporting compression to both sides of the composite vessel 22 as the piston 24 is forced into the cylindrical chamber 26.

Now, in greater detail, the composite high pressure vessel 22, containing the central high pressure chamber 26, is bounded on its upper and lower ends by the upper end load plate 32, and the composite lower end load plate or structure 34, respectively. As mentioned above, these end load structures support the ends of the high pressure structure 22, particularly the central tungsten carbide portion, and prevent it from rupturing when it is under extreme pressure from the reaction chamber 26. In addition, the upper end load plate 32 serves to seal the top end of the reaction chamber 26. The lower end load plate structure 34 is a composite arrangement which will be described in greater detail below in connection with FIG. 4 of the drawings.

The forces required to move piston 24 into reaction chamber 26, thereby generating the high pressure within reaction chamber 26, are applied to piston 24 through the piston pusher 36 and the piston pusher driver 38, as shown in FIG. 4. The forces are generated by the hydraulic ram 40 which moves the hydraulic piston 42. Structural members 44 and 46 are positioned above the end load plate 32, and below the hydraulic ram 40, and these are firmly secured together by the typing members 48 so that the force loop is closed.

As mentioned above, when extremely high pressures are generated in the reaction chamber 26, forces are created in the composite high pressure vessel 22 which might cause it to rupture at the ends of the high pressure chamber 26. In order to avoid this type of occurrence, a second hydraulic ram 30 is provided, having one end positioned above the structural member 46, and the other in engagement with the structural member 50, which together with the typing elements 52 and the lower end load portion 54, forms a second force loop. This second force loop engages the composite high pressure vessel 22 on both sides, through the end load plate 32 at the top, and through the composite end load plate structure 34 on the bottom. Accordingly, when the hydraulic ram 30 is actuated, high pressures are placed on both ends of the composite pressure vessel 22 to counteract the stresses generated internally when the piston 24 is advanced.

As mentioned above, the overall configuration of the pressure applying apparatus shown in FIG. 2 was described in U.S. Pat. No. 3,704,969.

Figure 3:
FIG. 3 shows a prior art arrangement for growing diamonds employing a zinc plug to assist in the compression step.

FIG. 3 represents the prior art arrangement shown in U.S. Pat. No. 4,118,161, in which a zinc plug 58 is employed at the lower end of the high pressure chamber 62 to make initial engagement with the face of the piston 64. In FIG. 3, the cylindrical salt insulating bushing 66 is shown lining the pressure chamber 62 within the composite high pressure vessel having a central tungsten carbide member 68. As the piston 64 moves upward, the zinc element 58, which is relatively soft and ductile, squirts into the lower end of the space 70 within the salt bushing 66, so that the piston 64 may advance by a distance at least equal to the thickness of the zinc element 58 before any deformation of the bushing 66 occurs. Other details of the mode of operation of the prior art structure as shown in FIG. 3 are set forth in the above-identified U.S. Pat. No. 4,118,161.

As mentioned hereinabove, the arrangements as shown in U.S. Pat. Nos. 4,118,161 and 3,704,969, had certain shortcomings. In the arrangements which will be shown hereinbelow in connection with FIGS. 4 and 5, the central composite pressure vessel is more fully and firmly supported, and a smaller tungsten carbide piston may be utilized. More specifically, as shown in FIG. 4, the central pressure vessel 22 includes an inner tungsten carbide member 74 of cylindrical form and having the central pressure chamber 26, and also has a pair of binding rings 76 and 78 which are concentrically located and which bear on the tungsten carbide element 74 through a bushing 80 to support it against fracture from the very high pressures which are present in the central pressure chamber 26. The end load plate structure 34 includes a smaller end load plate member 82 having a central frustoconical protruberance 84 which matches a similar conical enlargement of the lower end of the pressure chamber 26. The flat end of the protruberance 84 matches the end of the salt bushing 86 which lines the pressure chamber. Incidentally, the salt bushing 86 is of insulating material to permit heating of the charge electrically, and this salt bushing may, for example, be formed of sodium chloride, potassium bromide, or of pyrophyllite.

The outer end of the tungsten carbide piston 24 may be provided with a binding ring 88 made of Vasco type 250 steel, in order to reduce the likelihood of fracture of the tungsten carbide piston under the high pressures which are transmitted by it. The outer diameter of the piston 24 may be approximately 0.003 inch less than the inner diameter of the end load plate 82, and a thin lead sheet or coating 90 surrounding the piston 24 may be employed in the space between the piston 24 and the end load plate 82 to give additional support to the tungsten carbide piston and reduce the likelihood of its fracture or cracking. It may be noted that, with the extension of the end load plate 82 into the lower end of the tungsten carbide core element 74, increased support and firm orientation of the element 74 relative to the piston 24 is assured, to a greater extent than in the prior arrangements, in which the end load plates had a significant area of clearance around the lower opening of the pressure chamber.

In addition, the piston 24 is of reduced diameter, substantially equal to the inner diameter of the bushing 86, instead of being equal to its outer diameter. With the tungsten carbide pistons being relatively expensive, and only lasting for perhaps 10 runs, a significant cost saving is achieved by using the reduced diameter pistons.

The composite end load plate structure 34 includes the end load plate 94, in addition to the end load plate 82, and it in turn is in engagement with the end load platen 54, a structural member which is also shown in FIG. 2. Accurate alignment of the three plates 82, 94 and 54 is assured by the pair of locating pins 96 between the plates 82 and 94, and the pair of locating pins 98, between the plates 94 and 54. These are hardened and ground steel pins which are forced into one of the two plates, and which fit into mating recesses in the immediately adjacent surface of the next plate.

FIG. 5 is a cross sectional view of the pressure chamber 26 in the tungsten carbide core 74, and with the upper and lower end load plates 32 and 82 in place. Lining the chamber 26 is the insulating salt bushing 86. Within the bushing 86 is the charge 102, which is contained within a thin walled stainless steel cylinder 104. At the top of the charge container is a carbon plug 106 which is of high resistance material and which will tend to provide increased heating at the upper end of the charge. Similarly, a plug 108 of high resistance boron nitride plus graphite material is located at the bottom end of the cylindrical charge. Both the plugs 106 and 108 cause increased heating at the ends of the charge so that there is a relatively uniform, or "flat", temperature distribution along the length of the charge 102. The plug 108 is of slightly different material in order to facilitate free and easy movement of the plug 108 inwardly as the piston starts its upward compressive movement.

Incidentally, although a fifty-fifty alloy of nickel and iron was mentioned in connection with FIG. 1, it is preferred to use an alloy of 40% nickel and 60% iron, and this would be finely powdered and mixed with graphite as included in the charge 102 of FIG. 5. Concerning dimensions, it is normally desirable that the salt bushing be approximately ⅛th inch thick. Accordingly, in FIG. 5, if the internal diameter of the pressure chamber 26 is ¾ of an inch, then the outer diameter of the salt bushing 86 is slightly less than ¾ of an inch, and its inner diameter is approximately ½ inch. The diameter of the stainless steel tube 104 containing the charge 102 will then be approximately ½ inch. The piston 24 which is employed will be approximately ½ inch in diameter and closely fit the inside of the hole in the end load plate 82, as mentioned hereinabove. With a pressure chamber diameter of approximately ¾ of an inch, the length of the pressure chamber should be approximately 6 inches. Similarly, using a pressure chamber having a diameter of approximately 1¼ inches, the length of the chamber would be approximately 10 inches.

It may be noted that, for a 1.82 inch diameter chamber, the tungsten carbide piston may be reduced in diameter from ¾ of an inch to ½ inch using the arrangements disclosed herein. As the price of a suitable ½ inch piston is only $17.00, as compared with a $29.00 figure for a ¾ inch piston of tungsten carbide, it may be seen that significant savings may be achieved through the present invention. Incidentally, in this connection, as mentioned above, the tungsten carbide pistons normally only last for about 10 runs.

For completeness, attention is directed to three additional articles which relate generally to the subject matter of the present invention and particularly to those areas of the subject matter which have been characterized hereinabove as being old: (1) "Crushing Strength of Cemented Tungsten Carbide Pistons", by John C. Haygarth and George C. Kennedy, Review of Scientific Instruments, Volume 38, No. 11, pages 1590–1592, Nov. 1967; (2) "The Pressures of Some Solid-Solid Transitions", by George C. Kennedy and Phillip N. LaMori, Journal of Geophysical Research, Volume 67, No. 2, Feb. 1962, pages 851 through 856; and (3) "Apparatus for Phase-Equilibrium Measurements at Pressures Up to Fifty Kilobars and Temperatures Up to 1750 Degrees C." by F. R. Boyd and J. L. England, Journal of Geophysical Research, Vol. 65, pages 741–748, 1960. Incidentally, concerning materials, the piston pusher members 36 and 38 may be made of tungsten carbide with outer cylindrical binding rings of steel extending along their length; the central core 74 may be made of other hard strong materials such as special steel or sintered aluminum oxide, and element 80 is a tapered steel shim.

In closing, it is emphasized that the present invention is not limited to the apparatus shown in the present drawings and disclosed herein. Thus, by way of example and not of limitation, the end load plates and platen may be aligned with and oriented with respect to one another and to the tungsten carbide core 74 with its associated pressure chamber 26, by other techniques than through the utilization of the tapered surfaces 84 and the tapered pins 96 and 98. For example, tapered pins, locating rings, and chamfered or tapered structures may be employed in any combination to orient these parts relative to one another. Also, except for the components and apparatus described herein as being novel, any of the known techniques in the diamond manufacturing field may be employed in the implementation of the present invention. Accordingly, the present invention is not restricted to that shown and described herein.

What is claimed is:

1. An improved apparatus for making diamonds comprising:
    a tungsten carbide pressure vessel having a central cylindrical opening, and having a tapered mouth at one end thereof;
    an insulating hollow cylindrical salt bushing lining said cylindrical opening, said bushing having a predetermined inner diameter;
    a high strength heavy steel end plate in engagement with said pressure vessel, said end plate having an external taper matching the taper at the mouth of said cylindrical opening, and a central opening aligned with and substantially of equal inner diameter to said predetermined inner diameter of said salt bushing;
    a tungsten carbide piston having an outer diameter a few thousandths of an inch less than said predetermined diameter of said end plate opening; and
    means for mounting said piston in said end plate opening to apply pressure to a charge within said salt bushing, and for applying sufficient force to said piston to raise the pressure within said charge above the stable diamond state for carbon, whereby carbon in the graphite form included in said charge is converted to diamond while said pressure is maintained.

2. An apparatus as defined in claim 1 further comprising soft metal bushing means for supporting said piston in said end plate as it is advanced into said pressure vessel.

3. An apparatus as defined in claim 1 further comprising an additional pressure member in engagement with said end plate and means for accurately locating and aligning said additional pressure member with respect to said end plate.

4. An improved very high pressure apparatus comprising:
    a pressure vessel having a cylindrical opening;
    an insulating hollow cylindrical bushing lining said cylindrical opening, said bushing having a predetermined inner diameter;
    a high strength heavy metal end plate in engagement with said pressure vessel, said end plate having a central opening aligned with and substantially of equal inner diameter to said predetermined inner diameter of said bushing;
    a piston having an outer diameter slightly less than said predetermined diameter of said end plate opening;
    means for mounting said piston in said end plate opening to apply pressure to a charge within said bushing, and for applying sufficient force to said piston to raise the pressure within said charge above the stable diamond state for carbon, whereby carbon in the graphite form included in said charge is converted to diamond while said pressure is maintained; and means for accurately aligning said end plate with said pressure vessel, said means for aligning including an annular enlargement around the mouth of the opening in said vessel, and a matching annular ridge around the opening in said end plate.

5. An apparatus as defined in claim 4 further comprising soft metal bushing means for supporting said piston in said end plate as it is advanced into said pressure vessel.

6. An apparatus as defined in claim 4 further comprising:
    an additional pressure member in engagement with said end plate; and
    means for accurately locating and aligning said additional pressure member with respect to said end plate.

7. An apparatus as defined in claim 4 wherein said annular recess and matching ridge are tapered.

8. An apparatus as defined in claim 4 further comprising means for uniformly heating a charge mounted in said cylindrical opening in said pressure vessel to a temperature above 1,000° centigrade.

9. An improved very high pressure apparatus comprising:
    a pressure vessel having a cylindrical opening;
    an insulating hollow cylindrical bushing lining said cylindrical opening, said bushing having a predetermined inner diameter;
    a high strength heavy metal end plate in engagement with said pressure vessel, said end plate having a central opening aligned with and substantially of equal inner diameter to said predetermined inner diameter of said bushing;
    a piston having an outer diameter slightly less than said predetermined diameter of said end plate opening;
    means for mounting said piston in said end plate opening to apply pressure to a charge within said bushing, and for applying sufficient force to said piston to raise the pressure within said charge above the stable diamond state for carbon, whereby carbon in the graphite from included in said charge is converted to diamond while said pressure is maintained; and
    means are provided for heating a charge including graphite uniformly throughout the length of said cylindrical opening is said pressure vessel to a temperature above the diamond formation temperature range.

* * * * *